United States Patent [19]

Kahlman

[11] Patent Number: 5,754,244
[45] Date of Patent: May 19, 1998

[54] IMAGE DISPLAY APPARATUS WITH LINE NUMBER CONVERSION

[75] Inventor: Hendricus M.J.M. Kahlman, Eindhoven, Netherlands

[73] Assignee: U.S. Philips Corporation, New York, N.Y.

[21] Appl. No.: 642,017

[22] Filed: May 2, 1996

[30] Foreign Application Priority Data

May 12, 1995 [EP] European Pat. Off. ............... 95201235

[51] Int. Cl.$^6$ ................................................. H04N 7/01
[52] U.S. Cl. ................................. 348/448; 348/458
[58] Field of Search .......................... 348/448, 458, 348/441, 445, 447

[56] References Cited

U.S. PATENT DOCUMENTS

| | | |
|---|---|---|
| 3,830,971 | 8/1974 | Van de Polder . |
| 5,301,031 | 4/1994 | Eot et al. ........................ 348/792 |
| 5,381,182 | 1/1995 | Miller et al. . |
| 5,446,498 | 8/1995 | Boon ............................. 348/448 |
| 5,473,382 | 12/1995 | Nohmi et al. .................. 348/448 |
| 5,530,482 | 6/1996 | Gove et al. .................... 348/448 |

*Primary Examiner*—Victor R. Kostak
*Attorney, Agent, or Firm*—Edward W. Goodman

[57] ABSTRACT

The invention concerns an image display apparatus having a non-interlaced display screen having a first number of display lines, to which an interlaced video signal (RGB-1) having a second number of video lines per field is applied, whereby the first number exceeds the second number but falls below twice the second number. A first line memory device (F1) is used for doubling the line number of the video signal (RGB-1). Second (F2) and third (F3) line memory devices each receive video lines of the line number doubled video signal, and provide a pair of video lines (RGB*, RGB**) at a reduced rate corresponding to the first number of display lines. An interpolator (7) provides the first number of display lines (RGB-2) to the display in response to the pair of video lines (RGB*, RGB**) received from the second (F2) and third (F3) line memory devices.

2 Claims, 2 Drawing Sheets

| RGB-1 | | | | | | | | | | | | | | |
|---|---|---|---|---|---|---|---|---|---|---|---|---|---|---|
| | 1 | | 3 | | 5 | | 7 | | 9 | | 11 | | 13 | |

| F1-0 | | | | | | | | | | | | | | |
|---|---|---|---|---|---|---|---|---|---|---|---|---|---|---|
| | | 1 | 1 | 3 | 3 | 5 | 5 | 7 | 7 | 9 | 9 | 11 | 11 | 13 | 13 |

| F2-I | | | | | | | | | | | | | | |
|---|---|---|---|---|---|---|---|---|---|---|---|---|---|---|
| | | 1 | 1 | 1 | 1 | 5 | 5 | 5 | 5 | 9 | 9 | 9 | 9 | 13 | 13 |

| F3-I | | | | | | | | | | | | | | |
|---|---|---|---|---|---|---|---|---|---|---|---|---|---|---|
| | | -1 | -1 | 3 | 3 | 3 | 3 | 7 | 7 | 7 | 7 | 11 | 11 | 11 | 11 |

| F2-0 | | | | | | | | | | | | | |
|---|---|---|---|---|---|---|---|---|---|---|---|---|---|
| | | | 1 | 1 | 1 | 5 | 5 | 5 | 9 | 9 | 9 | 9 | |

| F3-0 | | | | | | | | | | | | |
|---|---|---|---|---|---|---|---|---|---|---|---|---|
| | | | -1 | 3 | 3 | 3 | 3 | 7 | 7 | 7 | 11 | 11 |

| WF-RGB* | | | | | | | | | | |
|---|---|---|---|---|---|---|---|---|---|---|
| | | 3/5 | 4/5 | 1/5 | 2/5 | 1 | 2/5 | 1/5 | 4/5 | 3/5 | 0 |

| WF-RGB** | | | | | | | | | | |
|---|---|---|---|---|---|---|---|---|---|---|
| | | 2/5 | 1/5 | 4/5 | 3/5 | 0 | 3/5 | 4/5 | 1/5 | 2/5 | 1 |

IMAGE DISPLAY APPARATUS WITH LINE NUMBER CONVERSION

BACKGROUND OF THE INVENTION

1. Field of the Invention

The invention relates to an image display apparatus having a non-interlaced display screen and means for applying an interlaced video signal to the non-interlaced display screen, and to a line number conversion method for use in the image display apparatus.

U.S. Pat. No. 5,301,031 discloses a scanning conversion display apparatus for converting the number of scanning lines to be displayed to a number that can be accommodated on a matrix display panel, such as a liquid crystal panel, having a smaller number of scanning lines. The apparatus includes a control circuit which produces control signals in synchronism with the input video signal, horizontal and vertical scanning circuits each including a shift register operated by the control circuit, and a display panel which is formed of a matrix arrangement of pixels that are driven selectively by the scanning circuits.

The apparatus further includes a circuit which halts the operation of the vertical shift register at a certain interval within the effective scanning period of the vertical scanning circuit so as to extract vertical shift clocks, thereby removing the vertical shift clocks within the effective display period of the video signal, thereby periodically extracting scanning lines.

This known apparatus cannot cooperate with a display panel which does not allow such a periodical removal of vertical shift clocks and extraction of scanning lines.

SUMMARY OF THE INVENTION

It is, inter alia, an object of the invention to provide an image display apparatus which overcomes this problem. To this end, a first aspect of the invention provides a line number conversion method for providing a first number of non-interlaced video lines in response to a second number of interlaced video lines, whereby the first number exceeds the second number but falls below twice the second number, comprising the steps of doubling the second number of video lines to furnish twice the second number of non-interlaced video lines; providing a pair of video lines at a reduced rate corresponding to the first number of video as lines in response to the doubled second number of non-interlaced video lines; and interpolating the first number of video lines in response to the pair of video lines at the reduced rate. A second aspect of the invention provides an image display apparatus comprising a non-interlaced display screen having a first number of display lines; means for receiving an interlaced video signal having a second number of video lines per field, whereby the first number exceeds the second number but falls below twice the second number; means for doubling the second number of video lines to furnish twice the second number of non-interlaced video lines; means for providing a pair of video lines at a reduced rate corresponding to the first number of video lines in response to the doubled second number of non-interlaced video lines; and means for interpolating the first number of video lines in response to the pair of video lines at the reduced rate, to furnish the interpolated video lines to the non-interlaced display screen.

An advantageous embodiment of the invention concerns an image display apparatus having a non-interlaced display screen having a first number of display lines, to which an interlaced video signal having a second number of video lines per field is applied, whereby the first number exceeds the second number but falls below twice the second number. A first line memory device is used for doubling the line number of the video signal. Second and third line memory devices each receive video lines of the line number-doubled video signal, and provide a pair of video lines at a reduced rate corresponding to the first number of display lines. An interpolator provides the first number of display lines to the display in response to the pair of video lines received from the second and third line memory devices. The invention can advantageously be used for displaying PAL signals having 575 active interlaced video lines on a liquid crystal matrix display designed for VGA signals having 480 non-interlaced video lines, such that display lines are continuously applied to the matrix display without any interruption of the row scan as in the prior art.

These and other aspects of the invention will be apparent from and elucidated with reference to the embodiments described hereinafter.

DESCRIPTION OF THE PREFERRED EMBODIMENT

Figure 1:
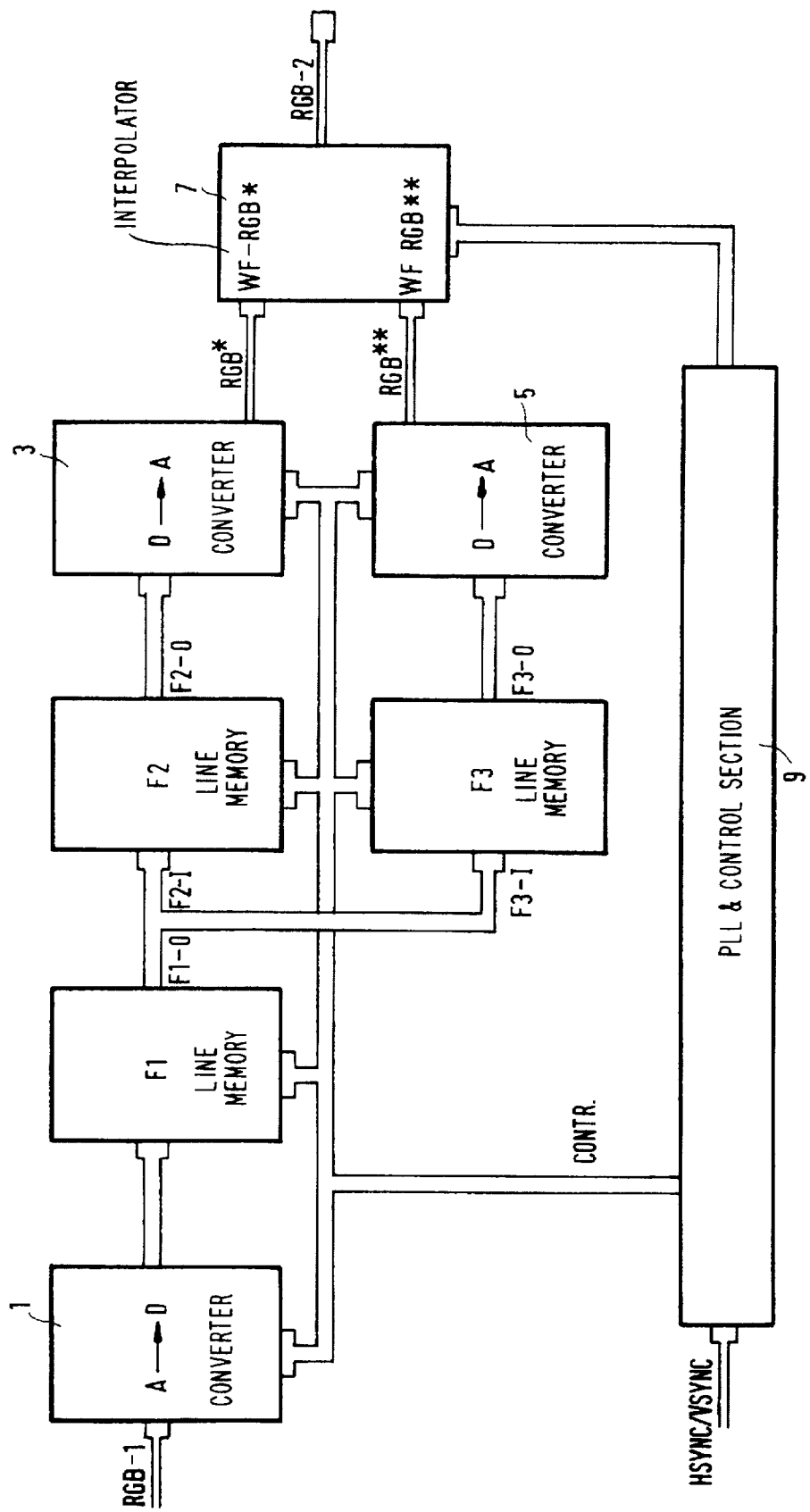
FIG. 1 illustrates a basic block diagram of a preferred embodiment of the invention.

In the embodiment shown in FIG. 1, an input red, green and blue color signal RGB-1 (shown on the first row of FIG. 2) is applied to an A/D converter 1, whose digitized output signal is furnished to a first line memory device F1 which doubles the line rate of the input signal. The output signal F1-O (shown on the second row of FIG. 2) of the line memory device F1 is applied to second and third line memory devices F2, F3, which read alternating video lines of the signal F1-O as is illustrated on the third row (signal F2-I read by the second line memory device F2) and the fourth row (signal F3-I read by the third line memory device F3) of FIG. 2. The second and third line memory devices F2, F3 furnish five output video lines in response to each six input video lines by carrying out appropriate delays, as is illustrated on the fifth row (signal F2-O supplied by the second line memory device F2) and the sixth row (signal F3-O supplied by the third line memory device F3) of FIG. 2.

Figures 2, 3:
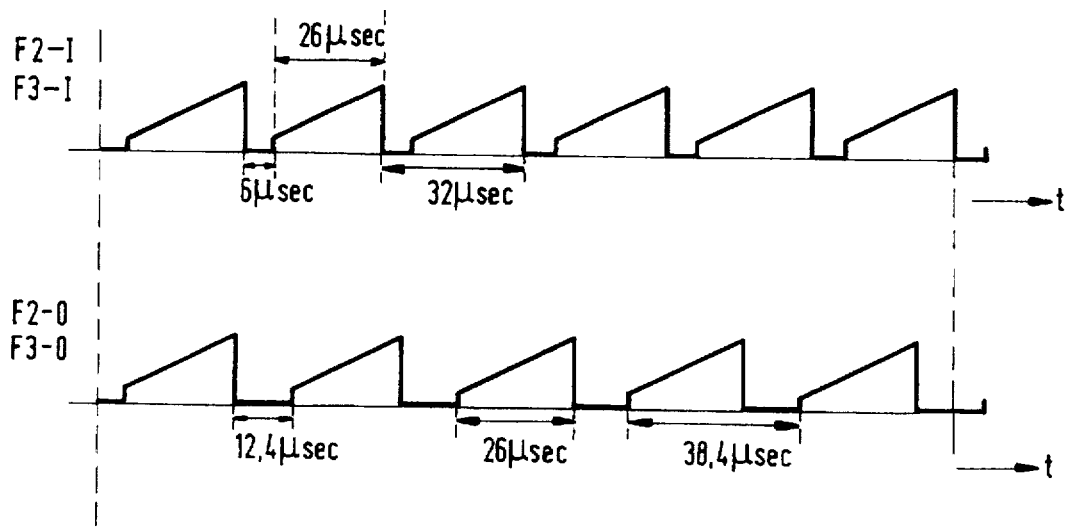
FIG. 2 shows a time diagram elucidating the embodiment of FIG. 1.
FIG. 3 illustrates how the line number conversion is carried out in the embodiment of FIG. 1.

FIG. 3 illustrates that the conversion from 6 to 5 video lines is carried out by increasing the ratio of blanking to active video such that the resulting 5 output video lines (signals F2-O, F3-O shown in the second row of FIG. 3) occupy the duration of the 6 input video lines (signals F2-I, F3-I shown in the first row of FIG. 3). This yields the advantage that the whole circuit can be operated by means of a single clock.

Turning back to FIG. 1, the output signals F2-O and F3-O of the second and third line memory devices F2, F3 are applied to respective D/A converters 3 and 5 to obtain analog color signals RGB* and RGB**, respectively. The analog color signals RGB* and RGB** are applied to respective inputs of an interpolator 7 which furnishes a signal RGB-2 to a non-interlaced display (not shown). The last two rows of FIG. 2 illustrate the weighting factors WF-RGB* and WF-RGB** by which the interpolator input signals RGB* and RGB**, respectively, are multiplied before being added together in the interpolator 7. A PLL and control section 9 provides control signals to all building blocks of the embodiment of FIG. 1 in response to horizontal and vertical sync signals Hsync/Vsync corresponding to the input color signal RGB-1.

The A/D converter 1 may be formed by means of the known IC TDA8703. The line memory devices F1, F2 and F3 may be formed by means of the known ICs UPD42102. The D/A converters 3 and 5 may be formed by means of the known ICs CX20206. The interpolator 7 may be formed by means of the known ICs HCT4051 and suitable resistor arrays.

It should be noted that the above-mentioned embodiments illustrate rather than limit the invention, and that those skilled in the art will be able to design many alternative embodiments without departing from the scope of the appended claims. The invention can be implemented by means of hardware comprising several distinct elements, and by means of a suitably programmed computer. Of course, instead of the analog interpolator 7 preceded by two D/A converters 3 and 5, a digital interpolator followed by a single D/A converter can be used. The shown analog interpolator 7 can, however, be realized very easily by means of a few resistors. By means of some straightforward modifications, any other line number conversion can be implemented as well.

I claim:

1. A line number conversion method for providing a first number of non-interlaced video lines in response to a second number of interlaced video lines, whereby the first number exceeds the second number but falls below twice the second number, said line number conversion method comprising the steps:

doubling the second number of video lines to furnish twice the second number of non-interlaced video lines;

providing a pair of video lines at a reduced rate corresponding to the first number of video lines in response to the doubled second number of non-interlaced video lines; and interpolating the first number of video lines in response to the pair of video lines at the reduced rate, wherein said step of providing a pair of video lines at a reduced rate includes increasing a ratio of blanking to active video such that the resulting output video lines at the reduced rate occupy a duration of the corresponding larger number of input video lines.

2. An image display apparatus, comprising:

a non-interlaced display screen having a first number of display lines;

means for receiving an interlaced video signal having a second number of video lines per field, whereby the first number exceeds the second number but falls below twice the second number;

means for doubling the second number of video lines to furnish twice the second number of non-interlaced video lines;

means for providing a pair of video lines at a reduced rate corresponding to the first number of video lines in response to the doubled second number of non-interlaced video lines; and means for interpolating the first number of video lines in response to the pair of video lines at the reduced rate, to furnish the interpolated video lines to the non-interlaced display screen, wherein said means for providing a pair of video lines comprises means for increasing a ratio of blanking to active video such that the resulting output video lines at the reduced rate occupy a duration of the corresponding larger number of input video lines.

\* \* \* \* \*